United States Patent
Fischer et al.

(10) Patent No.: US 7,257,820 B2
(45) Date of Patent: Aug. 14, 2007

(54) METHOD AND SYSTEM FOR USING INTEGRATION OBJECTS WITH ENTERPRISE BUSINESS APPLICATIONS

(75) Inventors: Jeffrey Michael Fischer, San Francisco, CA (US); Mark Coyle, San Francisco, CA (US)

(73) Assignee: Siebel Systems, Inc., San Mateo, CA (US)

(*) Notice: Subject to any disclaimer, the term of this patent is extended or adjusted under 35 U.S.C. 154(b) by 153 days.

(21) Appl. No.: 10/120,030

(22) Filed: Apr. 9, 2002

(65) Prior Publication Data

US 2003/0033437 A1  Feb. 13, 2003

Related U.S. Application Data

(63) Continuation of application No. 09/968,735, filed on Sep. 28, 2001, now abandoned.

(60) Provisional application No. 60/283,765, filed on Apr. 14, 2001.

(51) Int. Cl.
  *G06F 13/00* (2006.01)
(52) U.S. Cl. .................. 719/316; 719/332; 707/102; 707/103 R
(58) Field of Classification Search ............. 719/316, 719/332; 709/231; 707/100, 102, 103 R, 707/103 Y, 103 Z
See application file for complete search history.

(56) References Cited

U.S. PATENT DOCUMENTS

| | | | |
|---|---|---|---|
| 5,432,925 A | 7/1995 | Abraham et al. ........... 395/500 |
| 5,497,491 A * | 3/1996 | Mitchell et al. ............ 719/315 |
| 5,542,078 A | 7/1996 | Martel et al. | |
| 5,809,507 A | 9/1998 | Cavanaugh, III | |
| 5,958,004 A | 9/1999 | Helland et al. | |
| 6,125,383 A | 9/2000 | Glynias et al. | |
| 6,253,367 B1 * | 6/2001 | Tran et al. ................... 717/108 |
| 6,453,356 B1 * | 9/2002 | Sheard et al. ............... 709/231 |
| 6,574,635 B2 * | 6/2003 | Stauber et al. .......... 707/103 R |
| 6,601,072 B1 * | 7/2003 | Gerken, III ............. 707/103 R |
| 6,633,889 B2 * | 10/2003 | Dessloch et al. ....... 707/103 Y |
| 6,654,801 B2 * | 11/2003 | Mann et al. ................ 709/224 |
| 6,668,254 B2 * | 12/2003 | Matson et al. ................ 707/10 |

FOREIGN PATENT DOCUMENTS

| | | |
|---|---|---|
| EP | 1030254 A1 | 8/2000 |
| EP | 1122652 A1 | 8/2001 |

OTHER PUBLICATIONS

V. Y. Lum et al.; "A General Methodology for Data Conversion and Restructuring;" IBM Journal of Research and Development; International Business Machines Corp.; New York, NY; V. 20; No. 5; (Sep. 1, 1976); pp. 483-497.
Sybase; "PowerDesigner® WarehouseArchitect™ The Model for Data Warehousing Solutions;" Sybase Technical Paper; (Mar. 29, 1999); pp. 2-19.

* cited by examiner

*Primary Examiner*—William Thomson
*Assistant Examiner*—Andy Ho
(74) *Attorney, Agent, or Firm*—Campbell Stephenson LLP

(57) ABSTRACT

A method and system for using integration objects with enterprise business applications is disclosed. A method comprises importing external objects having a first format for a first enterprise application into a second enterprise application; using integration objects to transform the first format external objects into second format external objects formatted for the second enterprise application; and using the second format external objects in the second business application.

20 Claims, 8 Drawing Sheets

METHOD AND SYSTEM FOR USING INTEGRATION OBJECTS WITH ENTERPRISE BUSINESS APPLICATIONS

The present patent application is a continuation of prior application Ser. No. 09/968,735 filed Sep. 28, 2001 now abandoned entitled METHOD AND SYSTEM FOR USING INTEGRATION OBJECTS WITH ENTERPRISE BUSINESS APPLICATIONS.

This application claims the benefit of the filing date of the following Provisional U.S. Patent Application: "INTEGRATION OBJECTS", application No. 60/283,765, filed Apr. 14, 2001, having as inventors: Jeffrey Michael Fischer and Mark Coyle.

FIELD OF THE INVENTION

This invention relates to computer systems, and more specifically to a method and system for using integration objects with enterprise business applications.

BACKGROUND OF THE INVENTION

According to one observer, if the lifeblood of today's corporations is information, then their arteries are the "inter-application interfaces" that facilitate movement of data around the corporate enterprise. This has more recently become known as an "application network".

For the typical organization, the application network has grown organically into a collection of ad hoc application integration programs. This menagerie has had a very serious impact on businesses as it increases the time for implementing new applications, prevents senior management from getting a clear picture of the business and, in short, clogs the corporate arteries. In spite of the fact that application integration has become crucial to a competitive corporation's survival, it has nevertheless been acceptable in the prior art to handcraft or "hack" custom code for such purposes at enormous long-term cost to the corporation. Long-term application integration decisions have, likewise, been made at the lowest possible levels based solely on individual project criteria. Because of the decidedly difficult nature of these problems, an effective enterprise application integration (EAI) solution has yet to be found.

The advent of the Internet, client/server computing, corporate mergers and acquisitions, globalization and business process re-engineering, have together forced corporate information technology (IT) departments to continually seek out new, and often manual, ways to make different systems talk to each other—regardless of how old some of those systems may be. In the ensuing chaos, inadequate communications systems have had a debilitating effect on IT's abilities to move as fast as the business needs it to.

Recent trends in IT have only exacerbated this problem by increasing—often by an order of magnitude—the amount of inter-application interfacing needed to support them. Most recently, enterprise applications have performed such functions as data warehousing and enterprise resource planning (ERP), and facilitated electronic commerce. A brief review of these three technologies would, therefore, be helpful in understanding the long-felt but as yet unresolved need for EAI.

Data warehousing techniques require large volumes of clean historical data that must be moved, on a regular basis, from many operational systems into the warehouse. Source data is usually structured for online transactional processing (OLTP), while the typical data warehouse also accommodates online analytical processing (OLAP) formats. Therefore, the source data must undergo extensive aggregation and reformatting as it is transferred to the warehouse.

A typical data warehouse according to the prior art is populated in four steps: (a) extracting the source data; (b) cleaning such extracted data; (c) aggregating the cleaned, extracted data in a number of dimensions; and (d) loading the warehouse. Each warehouse source requires the building of a specific data extraction, cleansing, aggregation, and load routine. Forrester Research estimates that the average large company has approximately four data warehouses. In two years, it is expected that this number will grow to six. The average amount of data contained in each warehouse is also expected to double in size in that same period—from about 130 gigabytes to about 260 gigabytes.

The problems associated with such large amounts of data growing at an ever-increasing pace is exacerbated by the quality of source data. According to a study conducted by the META Group, typical data warehouses are being loaded today with as much as 20% poor quality data. That same study indicates that about 70% of its respondents used extraction, cleansing and loading processes that were coded by hand. With respect to the required aggregation processes, anecdotal evidence also reveals that as much as 50 hours of computer time may be required to complete this function alone. It is readily apparent that significant maintenance efforts would be involved with programs coded in such a manner.

On the other hand, typical ERP systems are essentially large, integrated packaged applications that support core business functions, such as payroll, manufacturing, general ledger, and human resources. Implementing an ERP system, however, can be an overwhelming process for a number of reasons.

First and foremost, the corporation is buying a product and not building a solution. This means that business units within the corporation must adapt to the product and how it works, not the other way around. Furthermore, today's ERP systems cannot replace all of a corporation's custom solutions. They must, therefore, communicate effectively with other legacy systems in place. Finally, it is not a typical for a corporation to employ more than one and completely different ERP system because a single vendor cannot usually meet every organizational need.

As a result, the options for getting data into and out of an ERP system preclude known approaches used for data warehousing. Each ERP system has a proprietary data model that is constantly being enhanced by its vendor. Writing extract or load routines that manipulate such models is not only complicated, but is also discouraged by the vendor since data validation and business rules inherent in the enterprise application are likely to be bypassed. Instead, ERPs require interaction at the business object level, which deals with specific business entities such as general ledgers, budgets or accounts payable.

Electronic commerce in one form or another has been around for many years. In essence, it got its start with electronic data interchange (EDI). EDI permitted companies to communicate their purchase orders and invoices electronically, and continued to develop such that today's companies use EDI for supply chain management. However, not until the more recent exploding use of online Internet websites to buy, sell, and even auction, items of interest has there been such a dire need for robust, effective EAI.

Applications get developed in order to accomplish a specific business objective in a measured time frame. In a typical large organization, different teams of people using a wide assortment of operating systems, DBMSs and development tools develop hundreds of applications. In each case, the specific requirements are satisfied without regard for integration with any other applications.

Several powerful trends are driving the market for application integration. For example, significant developments in peer-to-peer networking and distributed processing have made it possible for businesses to better integrate their own functional departments as well as integrate with their partners and suppliers. The aforementioned Internet/"intranet"/ "extranet" explosion is also fueling the demand for a new class of "human active" applications that require integration with back-end legacy applications. Tremendous growth around the world in the adoption of enterprise application software packages also requires integration with back-end legacy applications. Finally, message oriented middleware (MOM)—products such as IBM's MQSeries message queuing product—are becoming increasingly popular. Once customers realize the benefits of simple one-to-one application connectivity with MOM, their interest in many-to-many application integration increases significantly.

The key problem with many-to-many application integration (or even one-to-many integration) is that number of potential data transformations needed to connect all systems is very large. It may be as much as the square of the number of systems multiplied by the number of object types. To make this problem tractable, it is desirable to have methods to separate the semantic translation of objects from format translations and to have metadata-driven tools to perform the format translations.

In today's rapidly changing environment, the concerted efforts of thousands of developers worldwide are focused on developing a system that satisfies the need for disparate applications to communicate with each other, without the necessity of embedding multiple, customized application-specific translation schemes. This as yet unfulfilled need is grounded in the imperative of the global economy.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
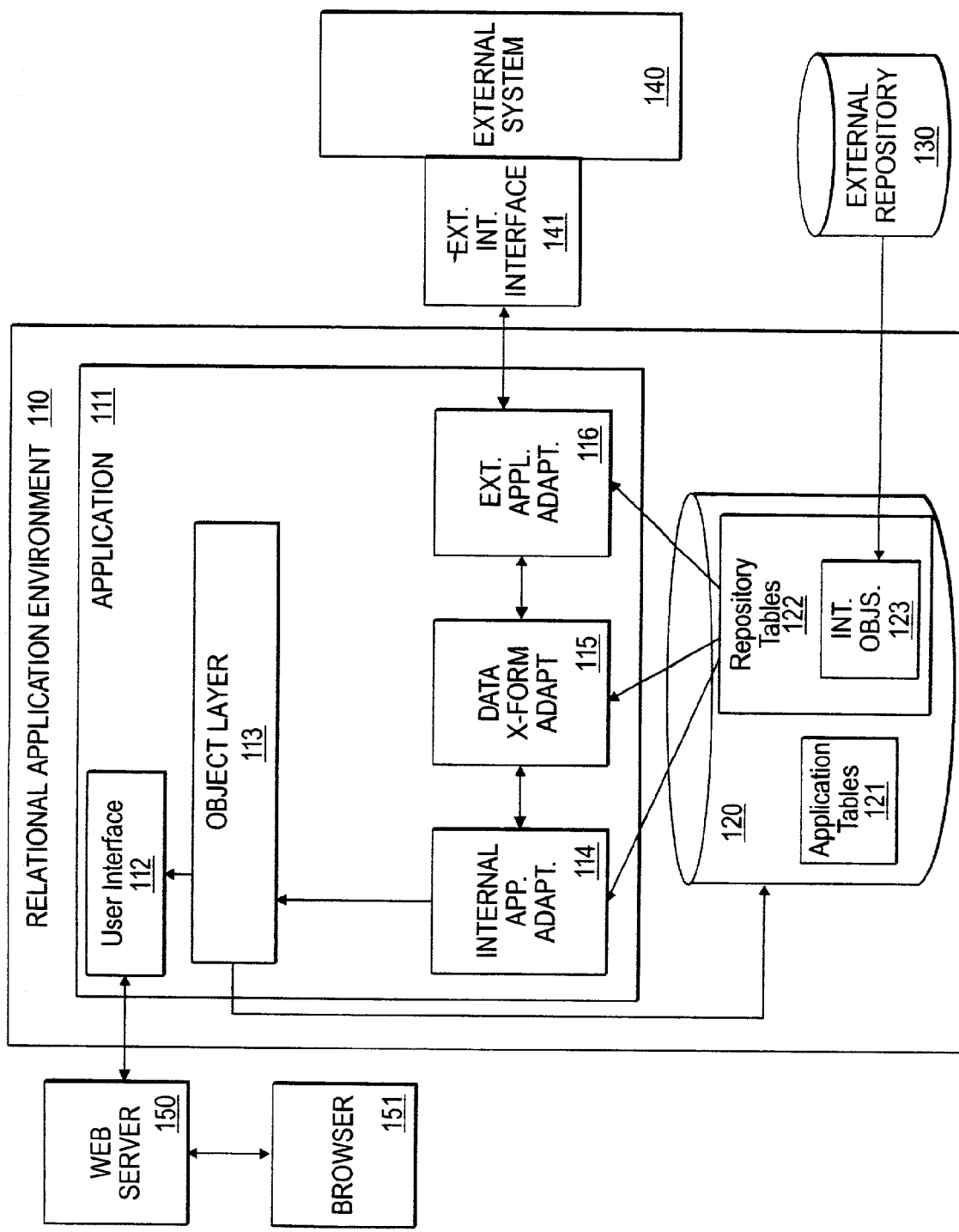
FIG. 1 illustrates a block diagram of a system 100 implementing integration objects.

A method and system for using integration objects with enterprise business applications is disclosed. In one embodiment, the method comprises importing external objects having a first format for a first enterprise application into a second enterprise application; using integration objects to transform the first format external objects into second format external objects formatted for the second enterprise application; and using the second format external objects in the second business application.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions, which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of a system 100 implementing integration objects. System 100 includes a relational application environment 110. The relational application environment 110 allows two different business application systems to share data. For example, if a company uses one base enterprise application system, and the company's supplier uses a different external business application system, environment 110 allows enterprise data from the external system to be accessible to the base system, in the base system's specific format.

Within environment 110 are two elements. Application 111 provides the ability of environment 110 to interface with external system 140 via external integration interface 141. The second element is relational database 120.

Application 111 includes an external application adapter 116. The external application adapter 116 communicates with external integration interfaces, such as interface 141. Adapter 116 creates a local representation of the external system's 140 data objects without losing the meaning of the external data objects. The local representation is provided to data transformation adapter 115. The names of fields within the local representation brought from external system 140 will be renamed to correspond with the naming conventions of environment 110, in order to create a common representation of the external system's 140 data objects. In addition, any semantic differences between the object structures of environment 140 and environment 110 are resolved by the Data Transformation Adapter. The common representation is provided to an internal application adapter 114. The internal application adapter 114 communicates with the internal object layer 113 directly.

Object layer 113 receives the common representation from internal data adapter 114, which is fully integratable with environment 110. The common representation may be stored as an object in relational database 120 by object layer 113. A user interface 112 may reside on top of object layer 113 and display the data. The data may also be displayed by a web browser 151 via a web server 150.

Relational database 120 includes application tables 121 and repository tables 122. Application tables 121 contain real data, such as accounts, orders or contact information. Respository tables 122 include integration objects 123 and business objects as well. The integration objects 123 are metadata that describes the format of external data objects of external system 140 that may be stored in external repository 130. The repository tables 122 are metadata that describes the format of application tables 121, as well as other structures used by the application, including integration objects. The integration objects 123 are provided to adapters 114–116, which read the external object definitions in order to integrate the external data objects into environment 110. Application 111 generates what a user will see via browser 151, by merging and integrating static configuration data from repository tables 122 with the dynamic data contained in application tables 121. For example, application 111 builds the HTML code provided to the webserver 150 that is viewed via browser 151. The web page may display account information and data fields for a call center application. The displayed information may be from an enterprise application different from the one with which the data is viewed.

The framework of system 100 described above allows multiple business systems having different data formats to be integrated, without the user having to write programming code or to hire a consultant to do so. The adapters 114–116 use the integration objects 123 as interchangeable components, so that the adapter 114–116 may be reused. Environment 110 may also be able to export its own object definitions using integration objects 123, so that external system 140 may integrate environment's 110 data objects. Furthermore, environment 110 may take external system's 140 object definitions (if they exist in external repository 130) and use them to integrate external system 140's data objects.

Figure 2:
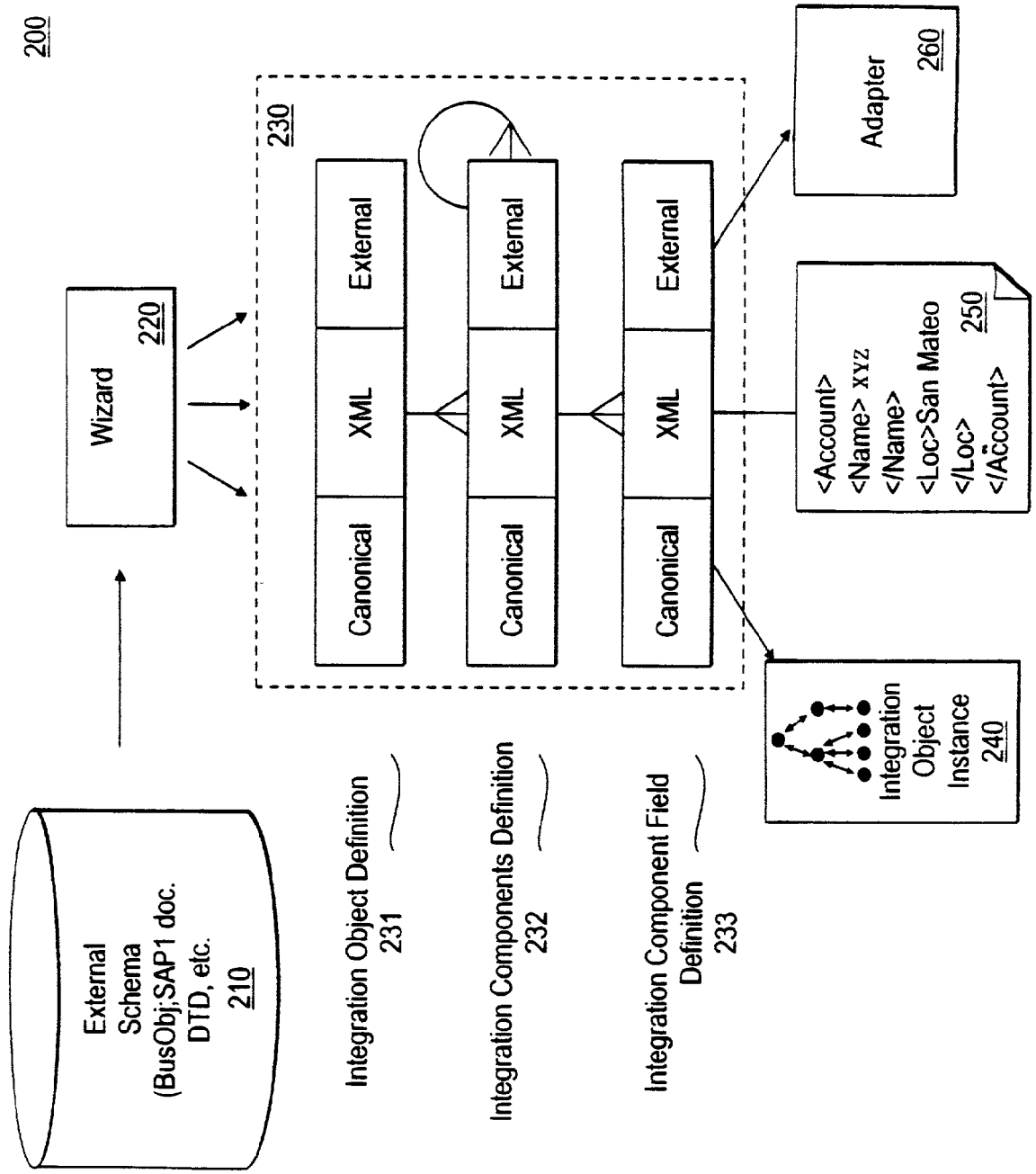
FIG. 2 is a high-level block diagram of a data integration system 200 according to one embodiment of the invention.

FIG. 2 is a high-level block diagram of a data integration system 200 according to one embodiment of the invention. Data objects of external schemes are resident within external repository 210. Repository 210 contains external integration object definitions that describe the external data objects in its own format schemes repository 210. Respository 210 is accessible by integration object wizard 220. Wizard 220 extracts the object definitions from repository 210 and creates a localized integration object 230.

Wizard 220 represents the user-interactive software that implements application 111. FIG. 2 shows the function of the wizard 220: it reads an object definition from external repository 210 and generates an integration object 230. The integration object declaratively defines a mapping between the external representation processed by adapter 260, integration object instance 240 and XML document 250. Table 1 illustrates one embodiment of a database schema for storing integration object definitions, although other implementations of the schema are feasible and considered within the spirit and scope of the present invention.

TABLE 1

| Column Name | Description | Datatype | Foreign Key Target Table |
|---|---|---|---|
| ID | Unique Id for this object | ID | |
| NAME | Name for this object in internal (canonical) representation | String | |
| EXT_NAME | Name for this object in external representation | String | |
| XML_NAME | XML Tag for this object | String | |
| ADAPTER_INFO | Additional information used by adapter for translation between external and internal formats | String | |

An integration object 230 is composed of "components," which contain named and typed fields. The components of an integration object are related to one another by parent-child relationships. Integration components and their fields can be linked to other physical components in its repository. The linking of integration components to physical objects provides a standard representation for adapters 114–116 to use when exchanging objects with external systems. For example, if the components of an integration object 230 are linked to table definitions, then an adapter 114–116 can place its output data in those tables or other tables with the same definition. The adapter 114–116 provides the external system with the integration object type and mapping from the integration components to the actual staging tables (if the tables referenced in the integration object definition were not used directly). A standard in-memory representation of integration objects occurs as well.

Each integration component definition may include a unique key as well as a foreign key to its parent. These keys may include multiple fields and may overlap. Table 2 illustrates one embodiment of a database schema for storing integration component definitions, although other implementations of the schema are feasible and considered within the spirit and scope of the present invention.

TABLE 2

| Column Name | Description | Datatype | Foreign Key Target Table |
|---|---|---|---|
| ID | Unique Id for this component | ID | |
| NAME | Name for this component in internal (canonical) representation, | String | |
| EXT_NAME | Name for this component in external representation | String | |
| XML_NAME | XML Tag for this component | String | |
| PAR_OBJ_ID | ID of parent object that this component belongs to. | ID | S_INT_OBJ |
| PAR_CMP_ID | ID of parent component type for this component (may by NULL if root). | ID | S_INT_COMP |
| ADAPTER_INFO | Additional information used by adapter for translation between external and internal formats | String | |

De-normalized tables where a table includes multiple components, and each row belongs to only one component are provided normalized logical representation. The repository 210 represents a normalized object on top of the de-normalized table.

The levels of integration object definitions are shown in FIG. 2. The three levels are the integration object definition 231, the integration component definition 232, and the integration component field definition 233. The integration object definition 231 maps a data object between an external system's representation and the local system's representation. Each definition level is composed of three sections as shown in FIG. 2, a canonical section, that describes the data object so the local system can understand; an external section, that describes the data object so the external system can understand; and an XML section, that describes the data object in a standardized format. Although described as XML, other markup languages similar to XML are considered to be within the scope of this embodiment.

The second level of integration object definition is the integration component definition level 232. This level groups together a set of scalar fields. The set of component types in an integration object are arranged in a hierarchy, with one "root" component. Within the object instance, there may be multiple instances of each component type. The third level of integration object definitions is the integration component field definition 233. A field defines a simple scalar value, such as a string, a number, or a date. Table 3 illustrates one embodiment of a database schema for storing integration component field definitions, although other implementations of the schema are feasible and considered within the spirit and scope of the present invention.

TABLE 3

| Column Name | Description | Datatype | Foreign Key Target Table |
|---|---|---|---|
| ID | Unique Id for this field | ID | |
| NAME | Name for this field in internal (canonical) representation, | String | |
| EXT_NAME | Name for this field in external representation | String | |
| XML_NAME | XML Tag for this field | String | |
| PAR_CMP_ID | ID of parent component type for this field | ID | S_INT_COMP |
| DATA_TYPE | Data type of this field (e.g. String, ID, Number, Date, Currency, etc.) in canonical representation. | String | |
| EXT_DATA_TYPE | Data type of this field in external representation. | String | |
| LENGTH | Length of this field in canonical representation | Number | |
| EXT_LENGTH | Length of this field in external representation | Number | |
| ADAPTER_INFO | Additional information used by adapter for translation between external and internal formats | String | |

If necessary, the field level 233 provides field name mapping between the canonical and external representations of the scalar value. Within the integration component instance, a given field instance may appear only once.

The canonical and external sections of integration object 230 may be used by adapter 260 to map between an external system's instance representation and Integration object instance 240. The XML sections of integration object 230 may be used to generate XML page 250. Adapter 260 may be an external adapter, such as adapter 116 or an internal adapter, such as adapter 114.

Figure 3:
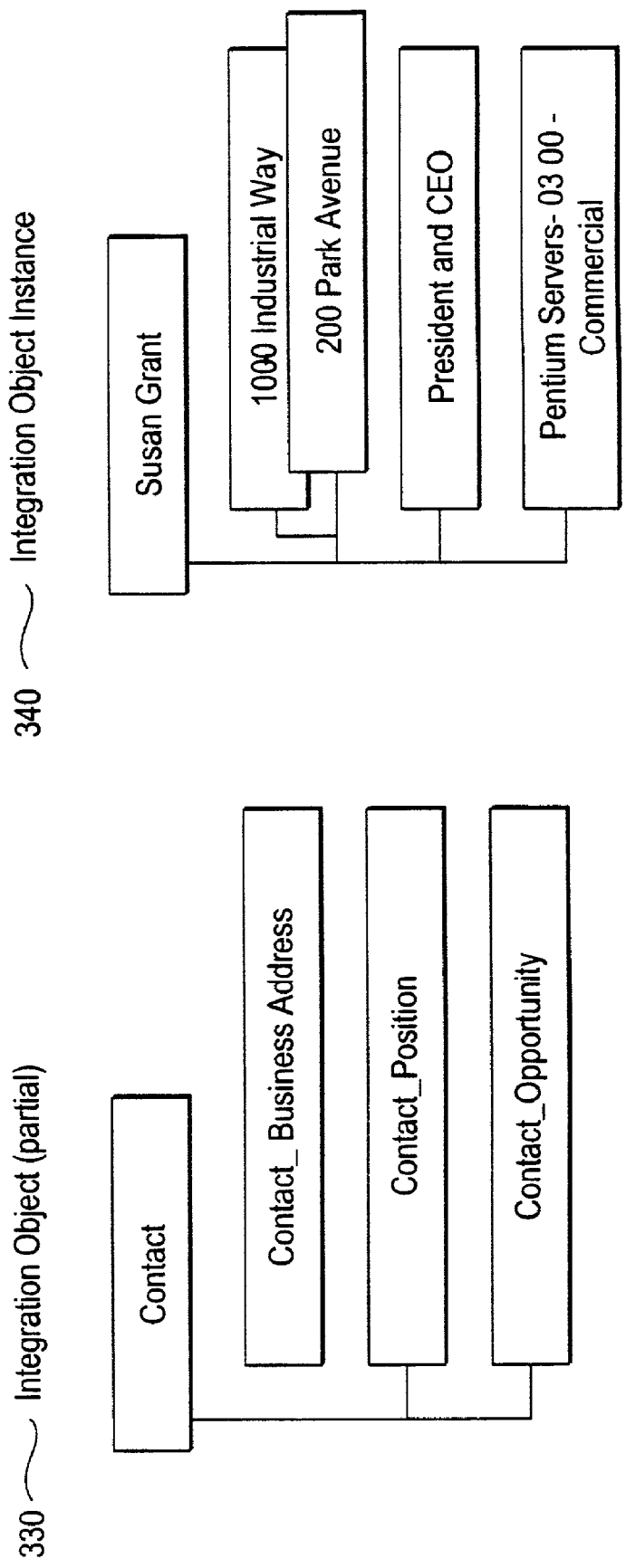
FIG. 3 illustrates the difference between an integration object 330 and an integration object instance 340.

FIG. 3 illustrates the difference between an integration object 330 and an integration object instance 340. Generally, an integration object 330 is metadata; that is, it is a generalized representation or model of a particular set of data. An integration object instance is actual data organized in the format or structure of the integration object 330 as seen in FIG. 3.

Figure 4:
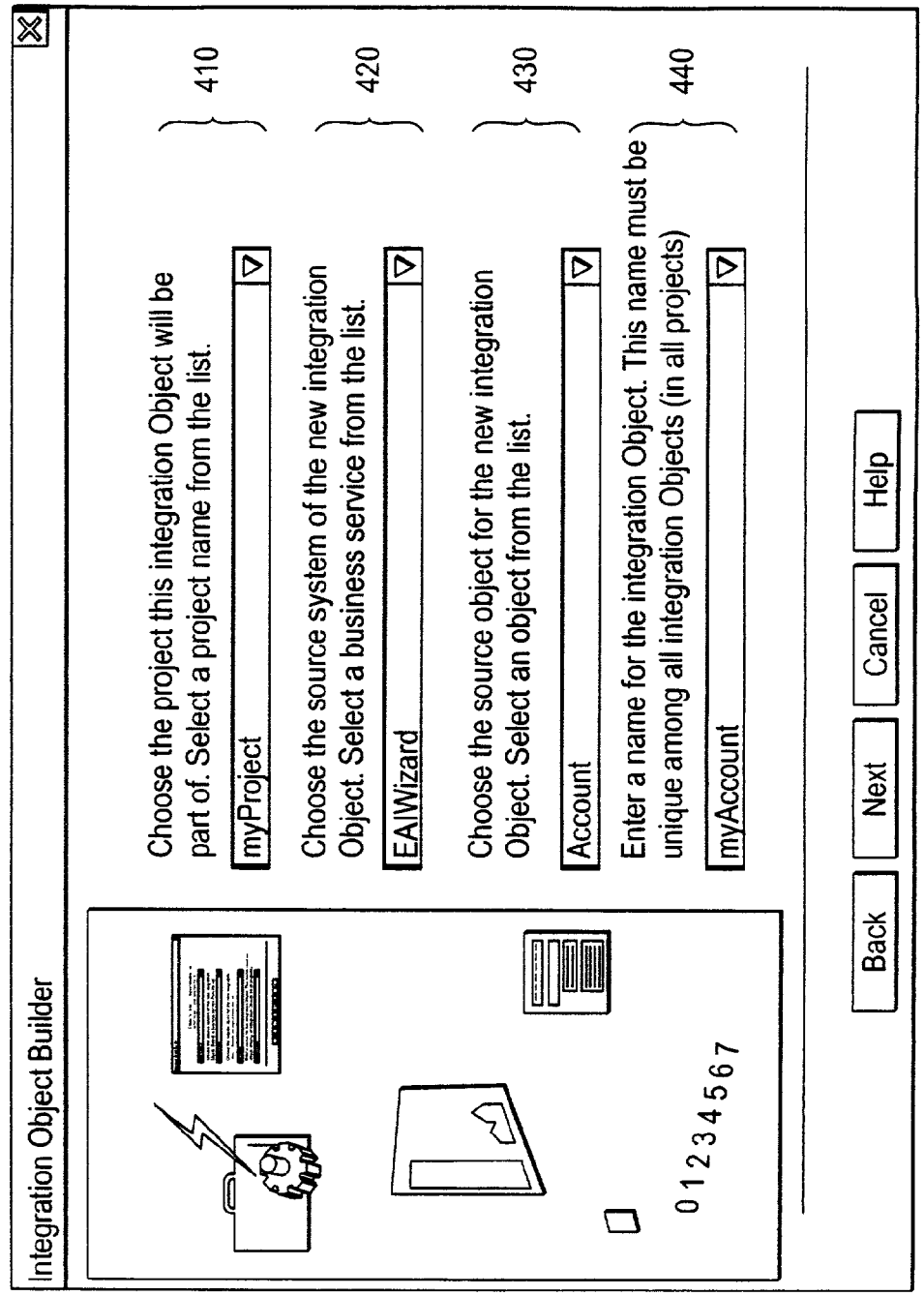
FIG. 4 illustrates an exemplary user interface 400 for building integration objects using wizard 220, according to one embodiment of the present invention.

FIG. 4 illustrates an exemplary user interface 400 for building integration objects using wizard 220, according to one embodiment of the present invention. At line 410 a new or existing project may be designated. At line 420 a business application for interfacing with the base (source) system is selected. A user then selects a source object that will be modeled for the new integration object being created at line 430. At line 440, the user enters a unique name for the new integration object. A similar user interface is used for selection of components to transfer between the two systems. There is also access to all children of each component that may be selected, or not.

Figure 5A:
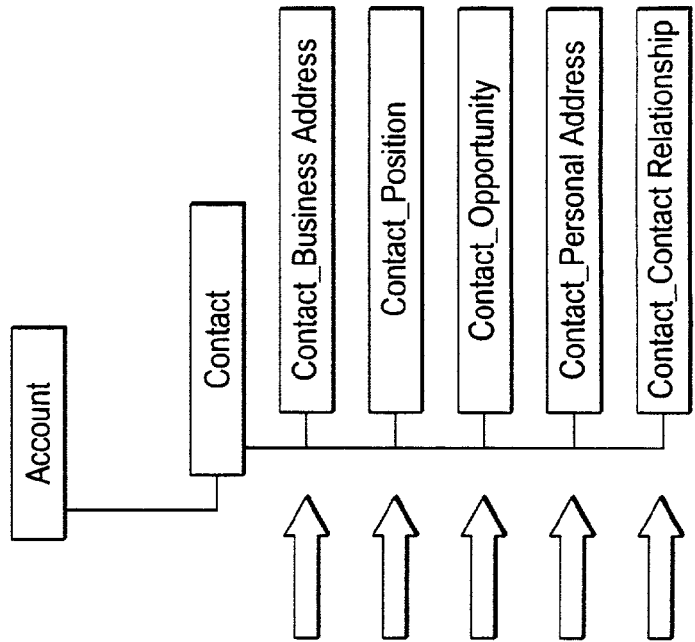
FIG. 5A illustrates an exemplary synchronization diagram 500 for integration objects.
Figure 5A:
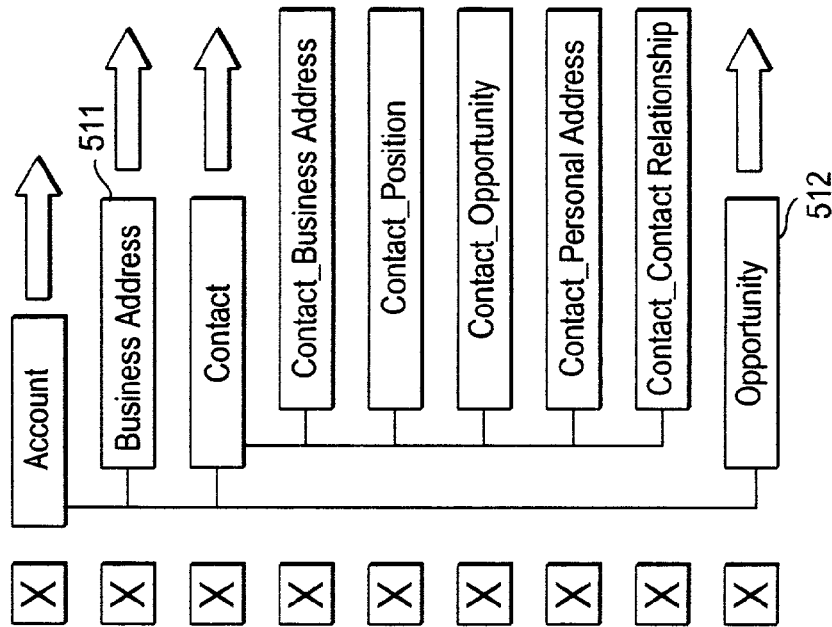
Figure 5B:
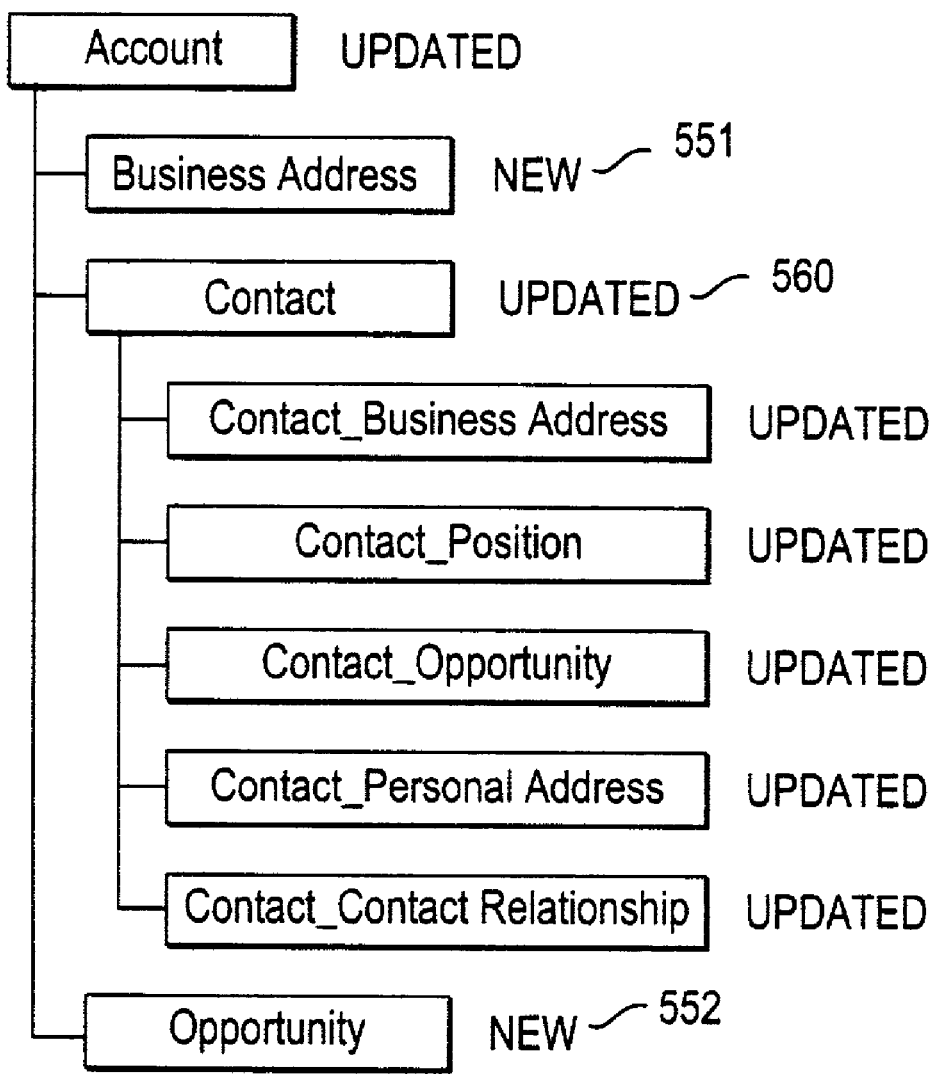
FIG. 5B illustrates a synchronized integration object 550.

Alteration of repository metadata is not uncommon, and it can cause problems at runtime if an integration object definition does not match the actual structure of the external object representation. To avoid these problems, it is desirable to have a tool to "synchronize" the integration object definition with a potentially changed external object definition. FIGS. 5A and 5B illustrate one possible embodiment of this tool. FIG. 5A illustrates an exemplary synchronization diagram 500 for integration objects. FIG. 5A includes two integration objects. Integration object 510 is a new in-memory integration object. Integration object 520 is an existing integration object stored in a database. Diagram 500 shows a new business object 510 with a number of components. Each component may be selected for synchronization by clicking on its corresponding box, as seen in diagram 500. The differences between the existing object 520 and new object 510 are noticeable with component 511 (business address) and component 512 (Opportunity). Thus, business address component 511 and opportunity component 512 are new components that are added to the existing integration object 520. FIG. 5B illustrates a synchronized integration object 550. The component "contact" 560 and all its children have been updated. Component "Business Address" 551 is new, as well as, component "Opportunity" 552. A component may also be deleted, by not selecting that component for synchronization.

Figure 6:
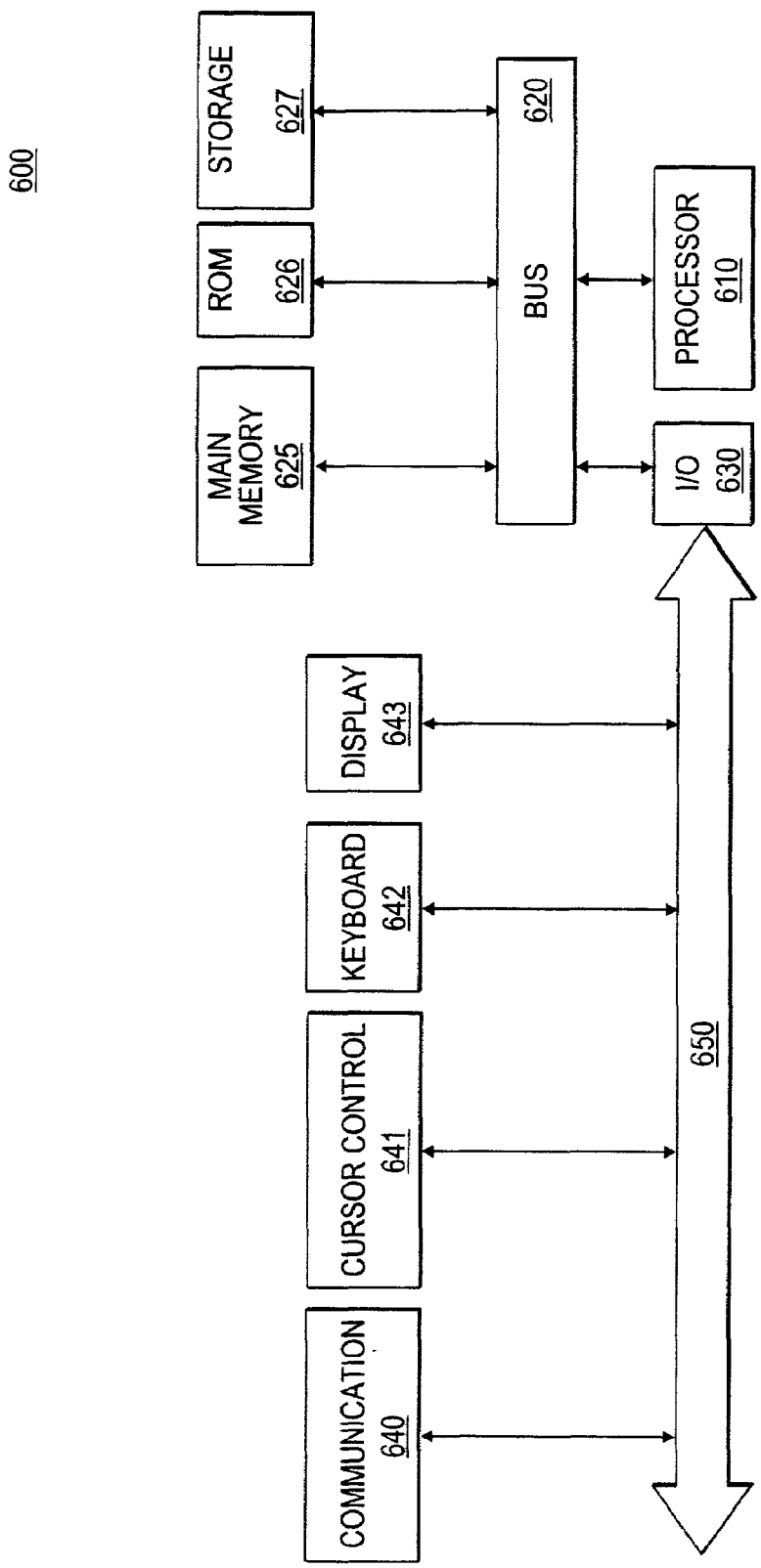
FIG. 6 illustrates a computer system 300 representing an integrated multi-processor, in which elements of the present invention may be implemented.

FIG. 6 illustrates a computer system 600 representing an integrated multi-processor, in which elements of the present invention may be implemented. For example, system 600 may be the architecture of server 150 or the hardware in which environment 110 exits. One embodiment of computer system 600 comprises a system bus 620 for communicating information, and a processor 610 coupled to bus 620 for processing information. Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and/or other static storage device 626 coupled to bus 620 for storing static information and instructions used by processor 610. Environment 110 may be implemented in system 600 where the repository 130 is implemented in storage 627. Communication between the adapters 114–116 and repository tables is typically made via bus 620. Browser interface may be shown on display 643

A data storage device 627 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 643, an input device (e.g., an alphanumeric input device 642 and/or a cursor control device 641).

The communication device 640 is for accessing other computers (servers or clients) via a network. The communication device 640 may comprise a modem, a network interface card, or other well-known interface device, such as those used for coupling to Ethernet, token ring, or other types of networks.

Figure 7:
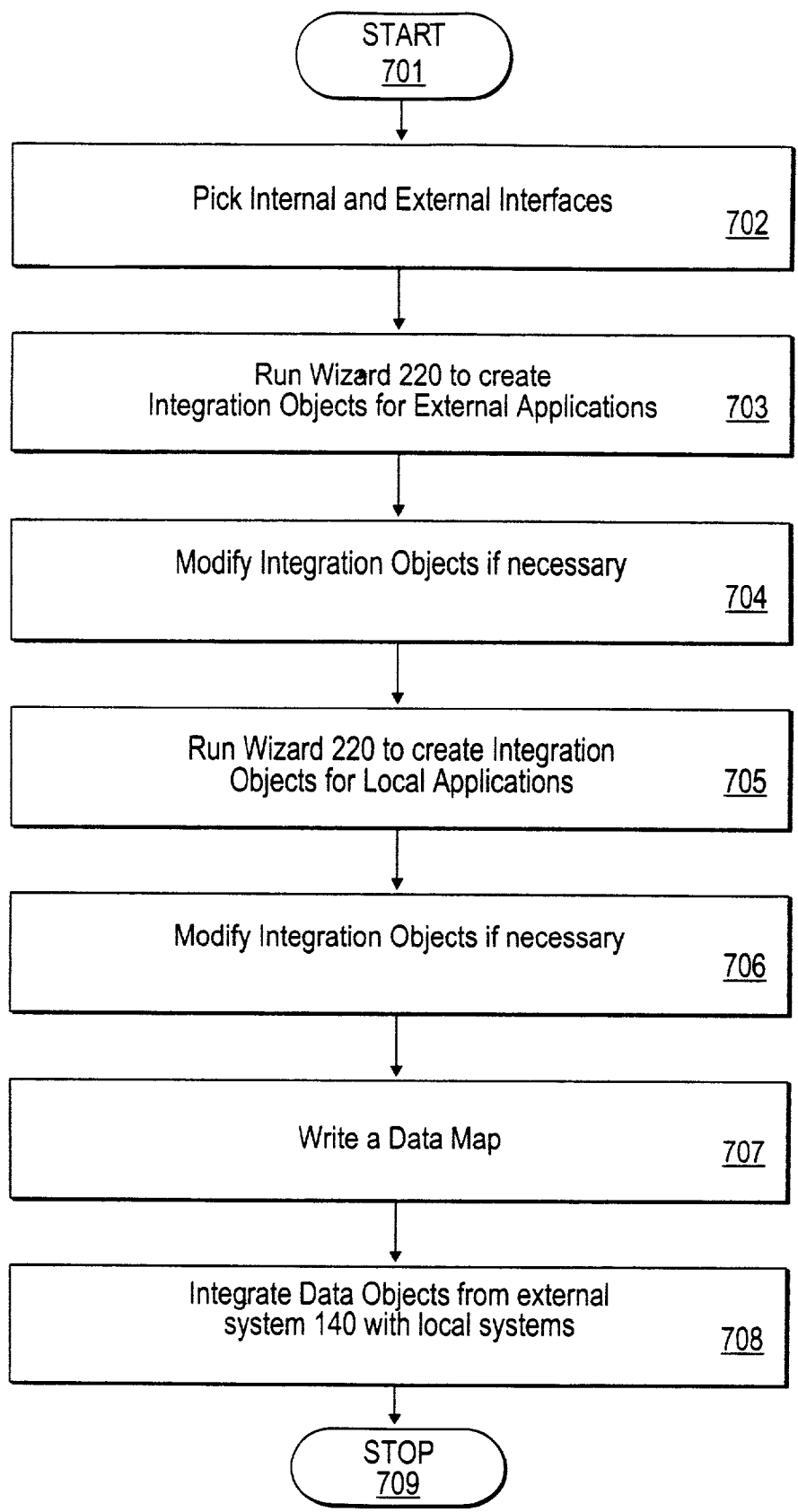
FIG. 7 illustrates a high level flow diagram 700 of a method for using integration objects with enterprise business applications.

FIG. 7 illustrates a high level flow diagram 700 of a method for using integration objects with enterprise business applications. The process begins at block 701 and flow continues to processing block 702. A user chooses the type of internal and external interfaces that are associated with the applications to be integrated.

Flow continues to processing block 703, where wizard 220 is used to create new integration objects for the external application's business objects. At processing block 704, the new integration objects are modified if necessary. For example, field names or relationships may be altered.

At processing block 705, wizard 220 is run to create integration objects for the local application(s). These local integration objects allow local data objects to be exported to an external system. Flow continues to processing block 706, where the user may modify the new local data objects, as described above.

Flow continues to processing block 707, where a data map is written. The data map indicate which external and internal interfaces correspond to the new integration objects, both internal and external. At processing block 708, both internal and external data objects may be integrated without user intervention. Flow completes at block 709.

A method and system for using integration objects with enterprise business applications is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A computer-implemented method, comprising:
receiving external objects in a format for a first application, wherein
a second application comprises an external adapter, and the external adapter performs said receiving;
creating a local representation of the external objects in the second application;
transforming the external objects into another format using one or more integration objects retrieved from a relational database, wherein
said transforming is performed in the second application,
each of the one or more integration objects defines a mapping between an external representation of an external data object and an integration object instance, and
each of the one or more integration objects comprises one or more of an integration object definition level, an integration component definition level, and an integration component field definition level; and
providing to an internal adapter in the second application the transformed objects for use in the second application.

2. The method of claim 1, wherein said transforming comprises:
receiving the local representation in a data transformation adapter from the external adapter, wherein
the second application further comprises the data transformation adapter;
providing to the data transformation adapter the one or more integration objects to rename, in the data transformation adapter, one or more fields contained in the local representation to correspond to the second application; and
creating, in the data transformation adapter, a common representation from the local representation.

3. A computer-implemented method, comprising:
receiving external metadata in an internal application, wherein the external metadata describes an external application;
transforming the external metadata into one or more integration objects using an integration object wizard, wherein
said transforming is performed by the internal application, and
each of the integration objects defines a mapping between an external representation of an external data object and an integration object instance;
storing the one or more integration objects in a relational database; and
using a selected integration object of the one or more integration objects to transform an external data object from the external application into a formatted data object for the internal application.

4. A computer system, comprising:
means for importing external objects having a first format for a first application into a second application;
means for creating a local representation of the first format external objects in the second application;
means for using transforming the first format external objects within the local representation into second format external objects formatted for the second application, wherein
the means for transforming uses integration objects retrieved from a relational database,
the second application comprises the means for transforming,
each of the integration objects defines a mapping between an external representation of an external data object and an integration object instance, and
each of the integration objects comprises one or more of an integration object definition level, an integration component definition level, and an integration component field definition level; and
means for using the second format external objects in the second application.

5. The system of claim 4, wherein the means for transforming further comprises:
means for receiving the first format external objects in an external application adapter of the second application to create the local representation of the first format external objects, wherein the external application adapter communicates with the first business application.

6. The system of claim 5, wherein the means for transforming further comprises:
means for receiving the local representation in a data transformation adapter of the second application from the external application adapter;
means for renaming, in the data transformation adapter, one or more fields contained in the local representation to correspond to the second application; and
means for creating, in the data transformation adapter, a common representation from the local representation.

7. The system of claim 6, wherein the means for transforming further comprises:
means for receiving the common representation in an internal application adapter of the second application from the data transformation adapter, wherein the internal application adapter communicates with an internal object layer; and
means for creating the second format external objects from the common representation by the internal application adapter.

8. A computer system, comprising:
means for receiving external metadata in an internal application, wherein the external metadata describes an external application;
means for transforming the external metadata into one or more integration objects using an integration object wizard, wherein
the internal application comprises the means for transforming, and
each of the integration objects defines a mapping between an external representation of an external data object and an integration object instance;
means for storing the integration objects in a relational database; and
means for transforming an external data object from the external application into a formatted data object for the internal application, wherein
the means for transforming uses a selected integration object of the one or more integration objects.

9. A computer-readable medium having stored thereon a plurality of instructions, said plurality of instructions when executed by a computer, cause said computer to perform a method comprising:
importing external objects having a first format for a first application into a second application;
creating a local representation of the first format external objects in the second application;
using integration objects retrieved from a relational database to transform, the first format external objects within the local representation into second format external objects formatted for the second application, wherein
the second application performs said using integration objects,
each of the integration objects defines a mapping between an external representation of an external data object and an integration object instance, and
each of the integration objects comprises one or more of an integration object definition level, an integration component definition level, and an integration component field definition level; and
using the second format external objects in the second application.

10. The computer-readable medium of claim 9 wherein using integration objects comprises:
receiving the first format external objects in an external application adapter of the second application to create the local representation of the first format external objects, wherein the external application adapter communicates with the first business application.

11. The computer-readable medium of claim 10 wherein using integration objects further comprises:
receiving the local representation in a data transformation adapter of the second application from the external application adapter;
renaming, in the data transformation adapter, one or more fields contained in the local representation to correspond to the second application; and
creating, in the data transformation adapter, a common representation from the local representation.

12. The computer-readable medium of claim 11 having stored thereon additional instructions, said additional instructions when executed by a computer, cause said computer to further perform:

receiving the common representation in an internal application adapter of the second application from the data transformation adapter, wherein the internal application adapter communicates with an internal object layer; and creating the second format external objects from the common representation by the internal application adapter.

13. A computer-readable medium having stored thereon a plurality of instructions, said plurality of instructions when executed by a computer, cause said computer to perform:

receiving external metadata in an internal application, wherein the external metadata describes an external application; and transforming the external metadata into one or more integration objects using an integration object wizard, wherein said transforming is performed by the internal application, and each of the integration objects defines a mapping between an external representation of an external data object and an integration object instance;

storing the integration objects in a relational database; and using a selected integration object of the one or more integration objects to transform an external data object from the external application into a formatted data object for the internal application.

14. A computer system, comprising:

an external application adapter of a second application to import external objects having a first format for a first application into the second application and to create a local representation of the external objects, wherein the second application comprises the external application adapter; and a relational database to store one or more integration objects that are used to transform the first format external objects within the local representation into second format external objects formatted for the second application, wherein said transforming is performed in the second application, the second format external objects are used by the second application, and each of the one or more integration objects defines a mapping between an external representation of an external data object and an integration object instance, and each of the one or more integration objects comprises one or more of an integration object definition level, an integration component definition level, and an integration component field definition level.

15. The system of claim 14, wherein the external application adapter communicates with the first application.

16. The system of claim 15 further comprising:

a data transformation adapter of the second application to receive the local representation from the external application adapter, wherein the data transformation adapter renames one or more fields contained in the local representation to correspond to the second application, and creates a common representation from the local representation.

17. The system of claim 16 further comprising:

an internal application adapter of the second application to receive the common representation from the data transformation adapter, wherein the internal application adapter communicates with an internal object layer, and creates the second format external objects from the common representation.

18. A computer system, comprising:

an internal application that receives external metadata, wherein the external metadata describes an external application; and an integration object wizard that transforms the external metadata into integration objects, wherein said transforming is performed by the internal application, and each of the integration objects defines a mapping between an external representation of an external data object and an integration object instance;

a relational database to store the integration objects, wherein a selected integration object of the integration objects is used to transform an external data object from the external application into a formatted data object for the internal application.

19. The method of claim 1, wherein each of the integration objects further defines a mapping between the integration object instance and a markup language document.

20. The method of claim 2, further comprising storing the common representation in the relational database.

* * * * *